US012572219B1

(12) United States Patent
Voros et al.

(10) Patent No.: US 12,572,219 B1
(45) Date of Patent: Mar. 10, 2026

(54) HYBRID PINCH DETECTION WITH MULTI-INPUT SOURCE

(71) Applicant: Snap Inc., Santa Monica, CA (US)

(72) Inventors: Daniel Voros, Budapest (HU); David Retek, Budapest (HU); Gabor Nemeth, Gyor (HU); Levente Torok, Vienna (AT)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/828,952

(22) Filed: Sep. 9, 2024

(51) Int. Cl.
| | |
|---|---|
| *G06F 3/01* | (2006.01) |
| *G06V 10/26* | (2022.01) |
| *G06V 10/40* | (2022.01) |
| *G06V 10/764* | (2022.01) |
| *G06V 10/80* | (2022.01) |
| *G06V 10/82* | (2022.01) |
| *G06V 40/20* | (2022.01) |

(52) U.S. Cl.
CPC .............. *G06F 3/017* (2013.01); *G06V 10/26* (2022.01); *G06V 10/40* (2022.01); *G06V 10/764* (2022.01); *G06V 10/806* (2022.01); *G06V 10/82* (2022.01); *G06V 40/28* (2022.01)

(58) Field of Classification Search
CPC ........ G06F 3/017; G06V 10/26; G06V 10/40; G06V 10/764; G06V 10/806; G06V 10/82; G06V 40/28
See application file for complete search history.

(56) References Cited

U.S. PATENT DOCUMENTS

| | | | |
|---|---|---|---|
| 2004/0042651 A1* | 3/2004 | Ii | G06V 30/242 |
| | | | 382/159 |
| 2016/0371833 A1* | 12/2016 | Prasad | A61B 5/1128 |
| 2017/0177087 A1* | 6/2017 | Lerner | G06F 3/017 |

(Continued)

FOREIGN PATENT DOCUMENTS

| | | | | |
|---|---|---|---|---|
| CN | 114254679 A | * | 3/2022 | G01M 13/045 |
| WO | WO-2024050260 A1 | | 3/2024 | |

OTHER PUBLICATIONS

"International Application Serial No. PCT/US2025/045472, International Search Report mailed Nov. 20, 2025", 3 pgs.

(Continued)

*Primary Examiner* — Stephen G Sherman
(74) *Attorney, Agent, or Firm* — SCHWEGMAN LUNDBERG & WOESSNER, P.A.

(57) ABSTRACT

The subject technology receives a set of inputs from multiple input sources. The subject technology determines a set of input features based on the set of inputs from the multiple input sources. The subject technology performs a time window-based aggregation on the set of input features to generate a set of aggregated features. The subject technology performs feature extraction, using a set of modular components of a modular classifier network, on the set of aggregated features to generate a set of extracted features. The subject technology generates, using a pinch detection head, a probability score indicating the likelihood of an occurrence of a pinch gesture based on the set of extracted features. The subject technology determines, using triggering logic, whether a pinch gesture has occurred based at least in part on the probability score. The subject technology provides a pinch detection output based at least in part on the determining.

18 Claims, 11 Drawing Sheets

(56)          References Cited

U.S. PATENT DOCUMENTS

| 2019/0340822 | A1* | 11/2019 | Ernst | ..................... | G06V 20/20 |
| 2022/0291753 | A1 | 9/2022 | Erivantcev et al. | | |
| 2023/0056020 | A1* | 2/2023 | Zhang | .................... | G06F 3/016 |

OTHER PUBLICATIONS

"International Application Serial No. PCT/US2025/045472, Written Opinion mailed Nov. 20, 2025", 6 pgs.

* cited by examiner

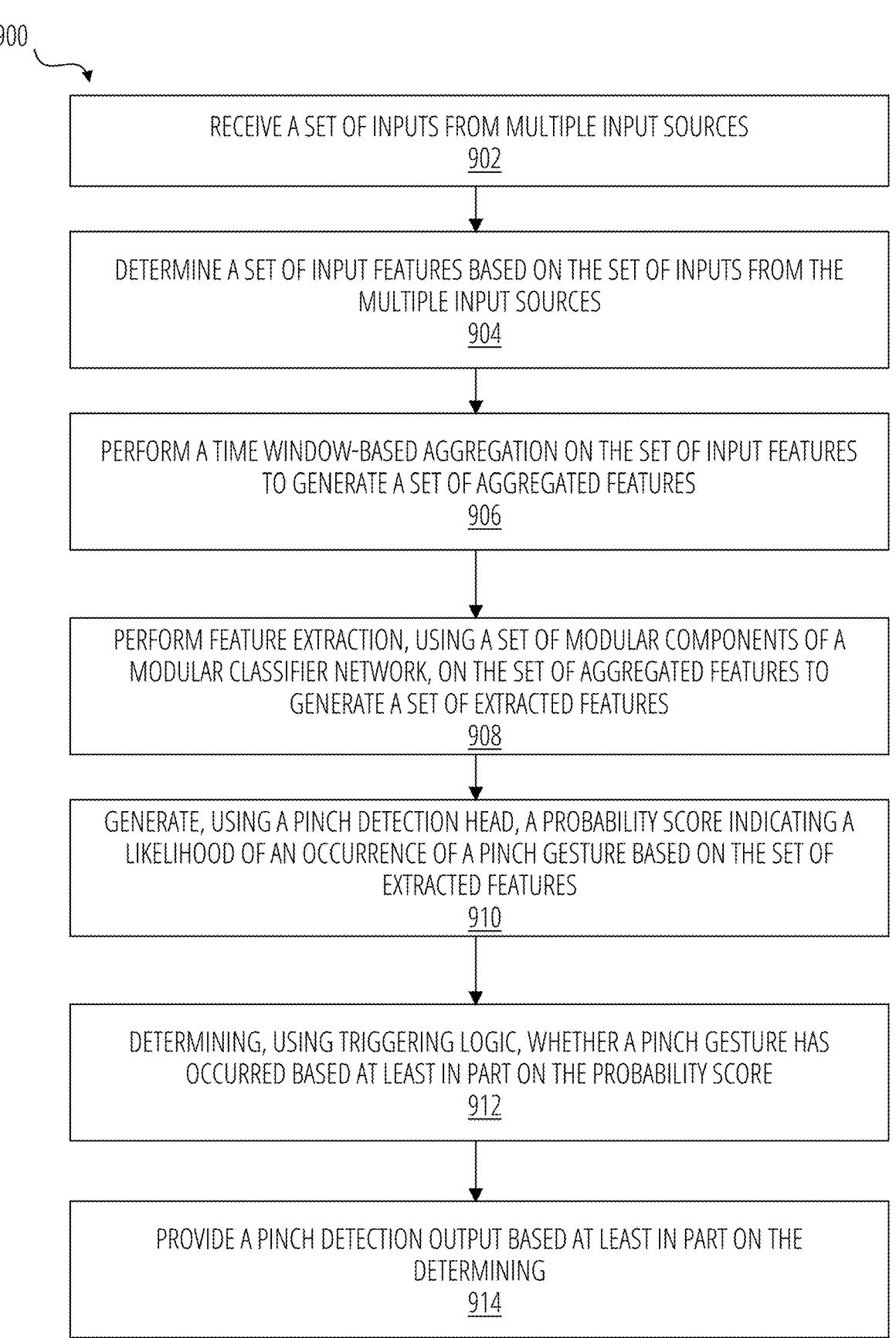

900

RECEIVE A SET OF INPUTS FROM MULTIPLE INPUT SOURCES
902

DETERMINE A SET OF INPUT FEATURES BASED ON THE SET OF INPUTS FROM THE MULTIPLE INPUT SOURCES
904

PERFORM A TIME WINDOW-BASED AGGREGATION ON THE SET OF INPUT FEATURES TO GENERATE A SET OF AGGREGATED FEATURES
906

PERFORM FEATURE EXTRACTION, USING A SET OF MODULAR COMPONENTS OF A MODULAR CLASSIFIER NETWORK, ON THE SET OF AGGREGATED FEATURES TO GENERATE A SET OF EXTRACTED FEATURES
908

GENERATE, USING A PINCH DETECTION HEAD, A PROBABILITY SCORE INDICATING A LIKELIHOOD OF AN OCCURRENCE OF A PINCH GESTURE BASED ON THE SET OF EXTRACTED FEATURES
910

DETERMINING, USING TRIGGERING LOGIC, WHETHER A PINCH GESTURE HAS OCCURRED BASED AT LEAST IN PART ON THE PROBABILITY SCORE
912

PROVIDE A PINCH DETECTION OUTPUT BASED AT LEAST IN PART ON THE DETERMINING
914

FIG. 9

HYBRID PINCH DETECTION WITH MULTI-INPUT SOURCE

TECHNICAL FIELD

The present disclosure relates generally to display devices and more particularly to display devices used for augmented and virtual reality, including detection and processing of inputs and gestures in connection with such devices.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." Collectively, AR and VR are known as "XR" where "X" is understood to stand for either "augmented" or "virtual." As used herein, the term XR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a 3D user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 is a flowchart illustrating a method, according to certain example embodiments.

DETAILED DESCRIPTION

Figure 1:
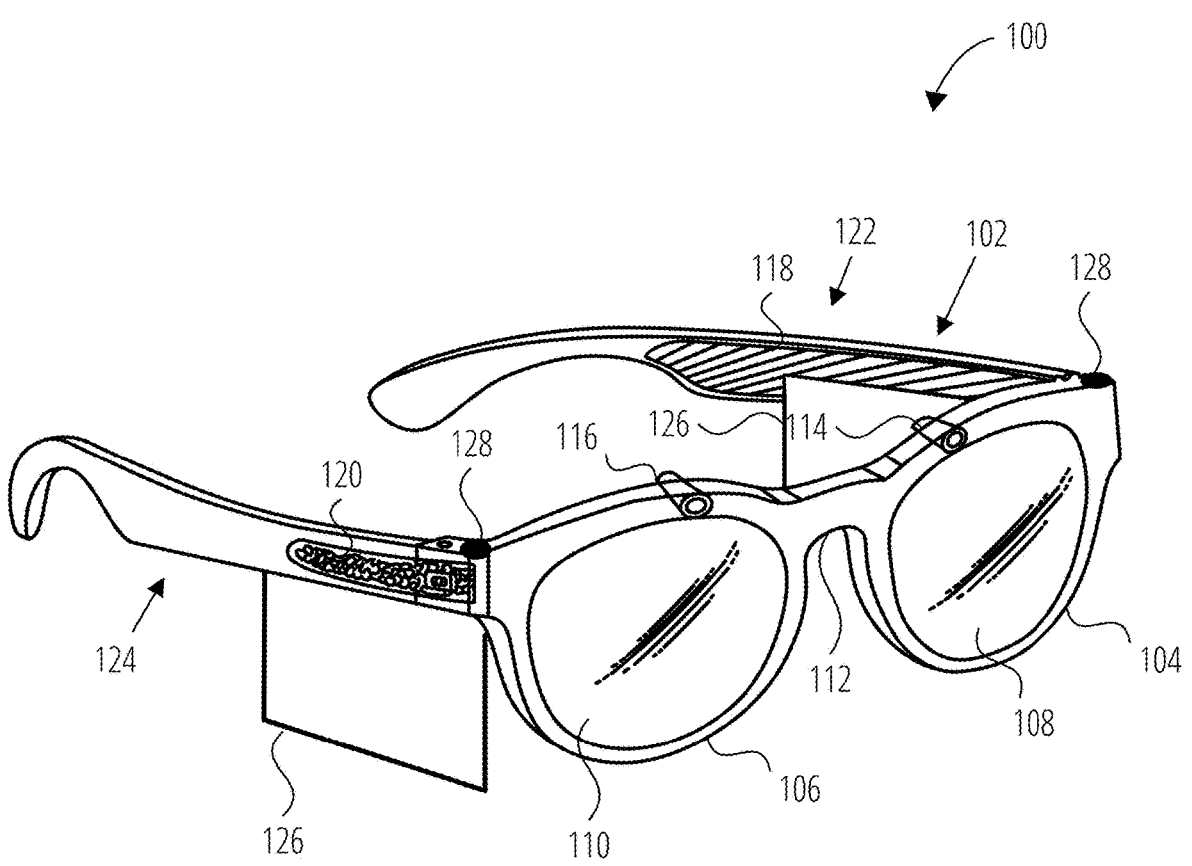
FIG. 1 is a perspective view of a head-worn device, in accordance with some examples.

Some head-worn XR devices, such as AR glasses, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality (AR) experience for the user. The display may for example include a waveguide that receives a light beam from a projector but any appropriate display for presenting augmented or virtual content to the wearer may be used.

The importance of accurate pinch detection in AR systems and the advantages of the disclosed modular architecture can be summarized in the following.

In regard to a pinch gesture as a primary control mechanism, the pinch gesture serves as the primary control mechanism in AR systems. Consequently, its accurate detection is important for ensuring robust system operation. This underscores the significance of developing a reliable pinch detection system for effective AR interactions.

As discussed herein, the disclosed modular model architecture offers an advantage in its ability to aggregate multimodal input sources. Such an aggregation is combined with additional rules, allowing different feature descriptors to enhance their individual impacts.

The subject system integrates various inputs, including:
Images from an arbitrary number of camera streams
Occlusion features
Hand skeleton model
This multi-modal approach enables the subject system to leverage diverse data sources, potentially leading to more accurate and robust pinch detection.

Providing a complete pinch-and-drag mechanism poses several possible challenges that the subject technology can address:
High responsiveness with minimal latency
Maintaining stability during complex dragging movements
Tackling challenges such as:
Motion blur
Self-occlusion
Fast movements
Orientation changes
By addressing these key aspects, embodiments of the subject technology provide a comprehensive solution for accurate and robust pinch detection in AR systems, potentially enhancing the user experience and system reliability.

As referred to herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real world are enhanced by computer-generated perceptual information. In this context an "augmented reality effect" comprises the collection of data, parameters, and other assets used to apply a selected augmented reality experience to an image or a video feed. In some examples, augmented reality effects are provided by Snap, Inc. under the registered trademark LENSES.

In some examples, a user's interaction with software applications executing on an XR device is achieved using a 3D User Interface. The 3D user interface includes virtual objects displayed to a user by the XR device in a 3D render displayed to the user. In the case of AR, the user perceives the virtual objects as objects within the real world as viewed by the user while wearing the XR device. In the case of VR, the user perceives the virtual objects as objects within the virtual world as viewed by the user while wearing the XR device To allow the user to interact with the virtual objects, the XR device detects the user's hand positions and movements and uses those hand positions and movements to determine the user's intentions in manipulating the virtual objects.

Generation of the 3D user interface and detection of the user's interactions with the virtual objects may also include detection of real world objects (e.g., faces, hands, bodies, cats, dogs, surfaces, objects), tracking of such real world objects as they leave, enter, and move around the field of view in video frames, and the modification or transformation of such real world objects as they are tracked. In various examples, different methods for detecting the real world objects and achieving such transformations may be used. For example, some examples may involve generating a 3D mesh model of a real world object or real world objects, and using transformations and animated textures of the model within the video frames to achieve the transformation. In other examples, tracking of points on a real world object may be used to place an image or texture, which may be two dimensional or three dimensional, at the tracked position. In still further examples, neural network analysis of video frames may be used to place images, models, or textures in content (e.g., images or frames of video). XR effect data thus may include both the images, models, and textures used to create transformations in content, as well as additional modeling and analysis information used to achieve such transformations with real world object detection, tracking, and placement.

Other technical features may be readily apparent to one skilled in the art from the following figures, descriptions, and claims.

Embodiments of the subject technology provide improvements to pinch gesture detection by implementing a hybrid pinch detection system for AR devices using multi-input sources. In an example, a pinch gesture refers to a closing movement of the thumb and index fingertip, used for interface control and object interaction in AR applications, and the like.

FIG. 1 is perspective view of a head-worn XR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 302 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
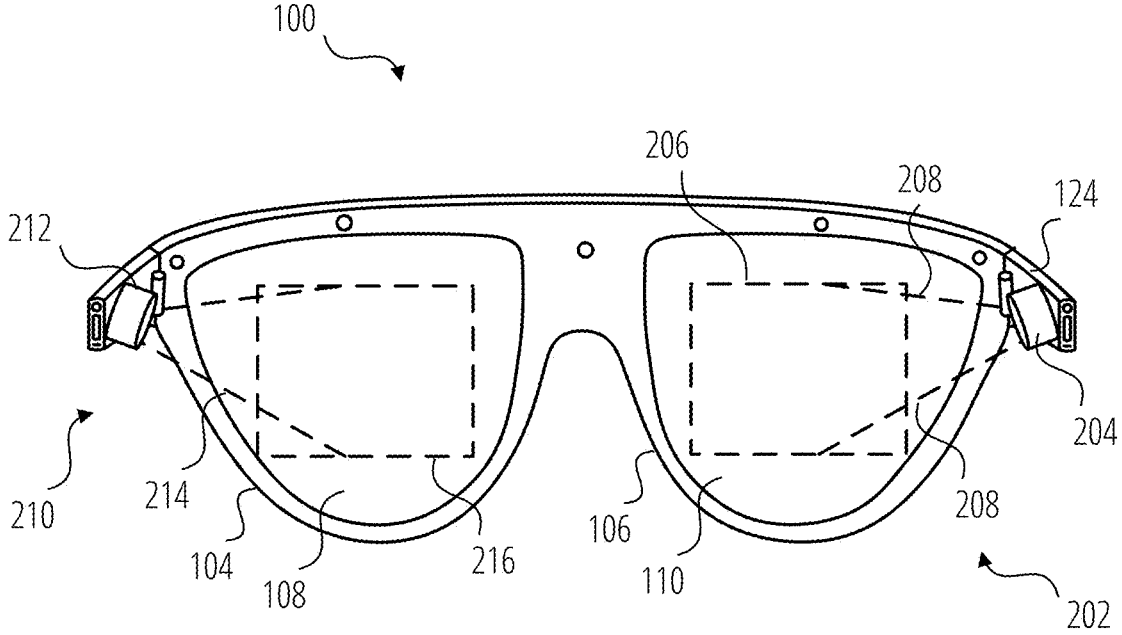
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user. The combination of a GPU, the forward optical assembly 202, the left optical element 108, and the right optical element 110 provide an optical engine of the glasses 100. The glasses 100 use the optical engine to generate an overlay of the real world view of the user including display of a 3D user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various 3D user interfaces on the near eye displays. As described in more detail herein, the user can then interact with the glasses 100 using a touchpad 126 and/or the buttons 128, voice inputs or touch inputs on an associated device (e.g. client device 328 illustrated in FIG. 3), and/or hand movements, locations, and positions detected by the glasses 100.

Figure 3:
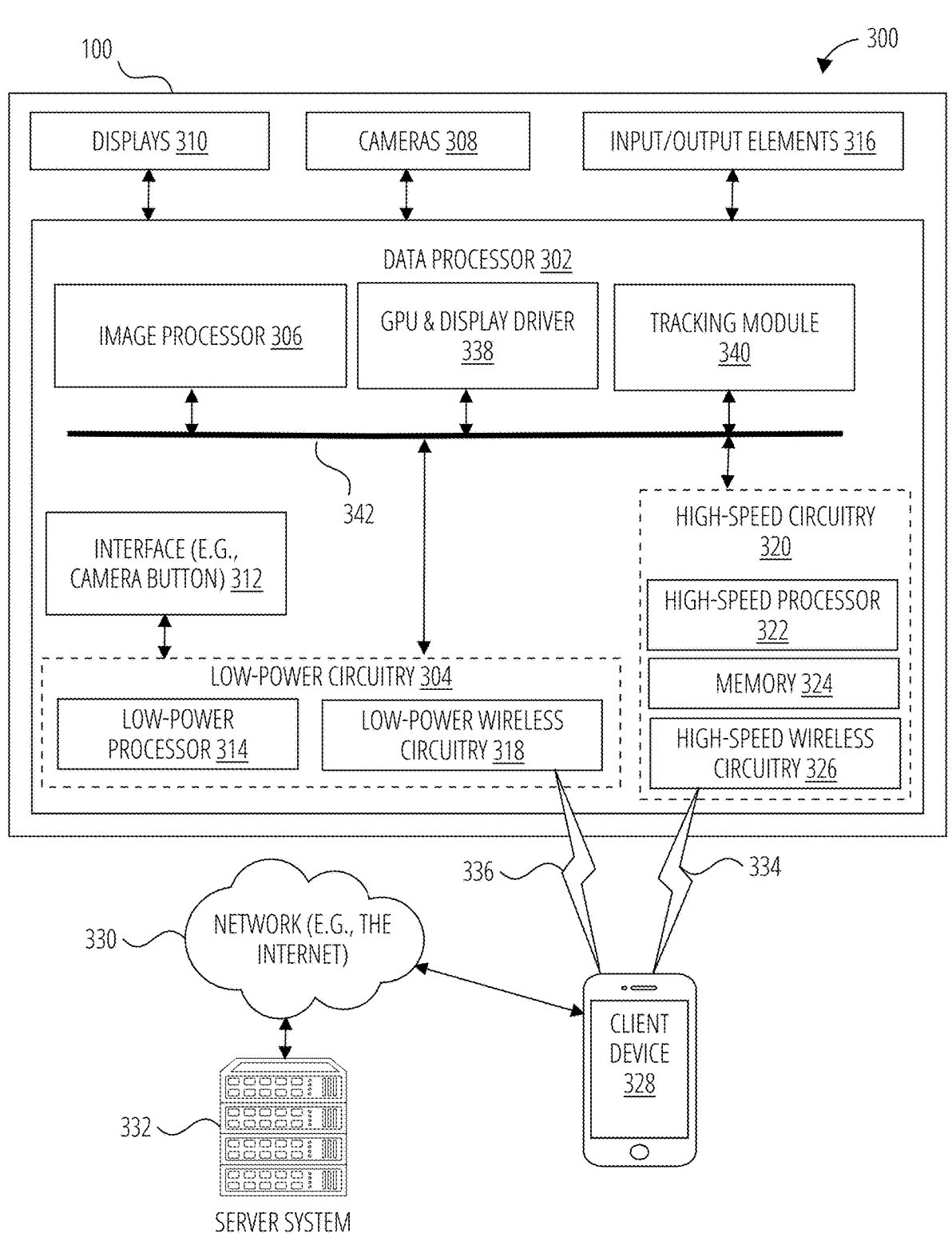
FIG. 3 is a block diagram illustrating a networked system 300 including details of the head-worn device of FIG. 1, in accordance with some examples.

FIG. 3 is a block diagram illustrating a networked system 300 including details of the glasses 100, in accordance with some examples. The networked system 300 includes the glasses 100, a client device 328, and a server system 332. The client device 328 may be a smartphone, tablet, phablet, laptop computer, access point, or any other such device capable of connecting with the glasses 100 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 1004 or the machine 1100 described in FIG. 10 and FIG. 11 respectively.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 10 and FIG. 11. For example, the input/output elements 316 may include any of I/O components 1106 including output components 1128, motion components 1136, and so forth. Examples of the displays 310 are discussed in FIG. 2. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system such as the operating system 1012 of FIG. 10. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE)

802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent stand-alone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 100. For example, the tracking module 340 uses image data and corresponding inertial data from the cameras 308 and the position components 1140, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the client device 328, or on a remote server. For example, one or more functions or operations described herein may be performed by one of the Applications 1006 such as messaging application 1046.

Figure 4:
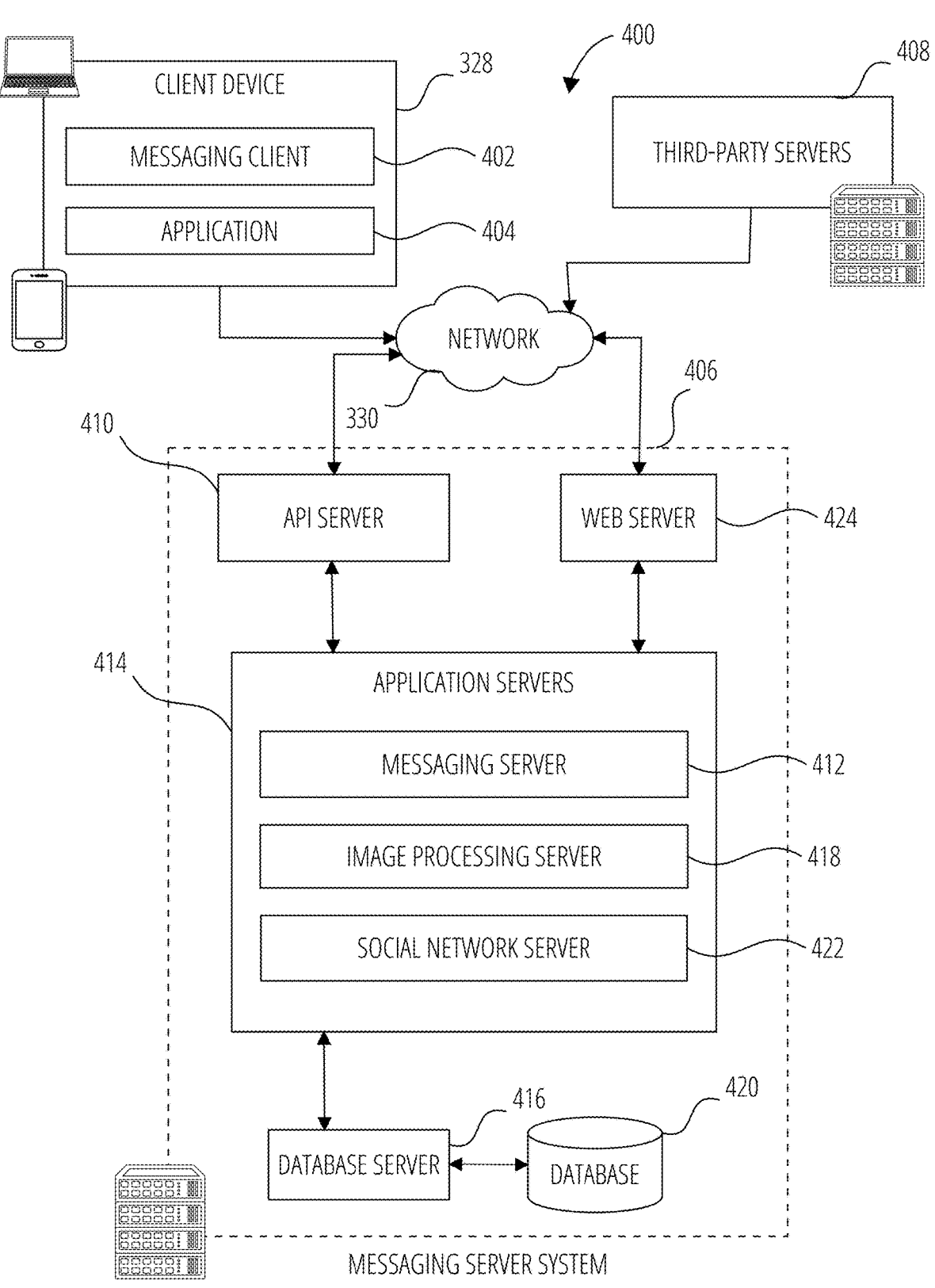
FIG. 4 is a diagrammatic representation of a networked environment in which the present disclosure may be deployed, in accordance with some examples.

FIG. 4 is a block diagram showing an example messaging system 400 for exchanging data (e.g., messages and associated content) over a network. The messaging system 400 includes multiple instances of a client device 328 which host a number of Applications, including a messaging client 402 and other Applications 404. A messaging client 402 is communicatively coupled to other instances of the messaging client 402 (e.g., hosted on respective other client devices 328), a messaging server system 406 and third-party servers 408 via a network 330 (e.g., the Internet). A messaging client 402 can also communicate with locally-hosted applications 404 using Applications Program Interfaces (APIs).

A messaging client 402 is able to communicate and exchange data with other messaging clients 402 and with the messaging server system 406 via the network 330. The data exchanged between messaging clients 402, and between a messaging client 402 and the messaging server system 406, includes functions (e.g., commands to invoke functions) as well as payload data (e.g., text, audio, video or other multimedia data).

The messaging server system 406 provides server-side functionality via the network 330 to a particular messaging client 402. While some functions of the messaging system 400 are described herein as being performed by either a messaging client 402 or by the messaging server system 406, the location of some functionality either within the messaging client 402 or the messaging server system 406 may be a design choice. For example, it may be technically preferable to initially deploy some technology and functionality within the messaging server system 406 but to later migrate this technology and functionality to the messaging client 402 where a client device 328 has sufficient processing capacity.

The messaging server system 406 supports various services and operations that are provided to the messaging client 402. Such operations include transmitting data to, receiving data from, and processing data generated by the messaging client 402. This data may include message content, client device information, geolocation information, media augmentation and overlays, message content persistence conditions, social network information, and live event information, as examples. Data exchanges within the messaging system 400 are invoked and controlled through functions available via user interfaces (UIs) of the messaging client 402.

Turning now specifically to the messaging server system 406, an Application Program Interface (API) server 410 is coupled to, and provides a programmatic interface to, application servers 414. The application servers 414 are communicatively coupled to a database server 416, which facilitates access to a database 420 that stores data associated with messages processed by the application servers 414. Similarly, a web server 424 is coupled to the application servers 414, and provides web-based interfaces to the application servers 414. To this end, the web server 424 processes incoming network requests over the Hypertext Transfer Protocol (HTTP) and several other related protocols.

The Application Program Interface (API) server 410 receives and transmits message data (e.g., commands and message payloads) between the client device 328 and the application servers 414. Specifically, the Application Program Interface (API) server 410 provides a set of interfaces (e.g., routines and protocols) that can be called or queried by the messaging client 402 in order to invoke functionality of the application servers 414. The Application Program Interface (API) server 410 exposes various functions supported by the application servers 414, including account registration, login functionality, the sending of messages, via the application servers 414, from a particular messaging client 402 to another messaging client 402, the sending of media files (e.g., images or video) from a messaging client 402 to a messaging server 412, and for possible access by another messaging client 402, the settings of a collection of media data (e.g., story), the retrieval of a list of friends of a user of a client device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 402).

The application servers 414 host a number of server Applications and subsystems, including for example a messaging server 412, an image processing server 418, and a social network server 422. The messaging server 412 implements a number of message processing technologies and functions, particularly related to the aggregation and other processing of content (e.g., textual and multimedia content) included in messages received from multiple instances of the messaging client 402. As will be described in further detail, the text and media content from multiple sources may be aggregated into collections of content (e.g., called stories or galleries). These collections are then made available to the messaging client 402. Other processor and memory inten- sive processing of data may also be performed server-side by the messaging server 412, in view of the hardware require- ments for such processing.

The application servers 414 also include an image pro- cessing server 418 that is dedicated to performing various image processing operations, typically with respect to images or video within the payload of a message sent from or received at the messaging server 412.

The social network server 422 supports various social networking functions and services and makes these func- tions and services available to the messaging server 412. To this end, the social network server 422 maintains and accesses an entity graph within the database 420. Examples of functions and services supported by the social network server 422 include the identification of other users of the messaging system 400 with which a particular user has relationships or is "following," and also the identification of other entities and interests of a particular user.

The messaging client 402 can notify a user of the client device 328, or other users related to such a user (e.g., "friends"), of activity taking place in shared or shareable sessions. For example, the messaging client 402 can provide participants in a conversation (e.g., a chat session) in the messaging client 402 with notifications relating to the cur- rent or recent use of a game by one or more members of a group of users. One or more users can be invited to join in an active session or to launch a new session. In some examples, shared sessions can provide a shared augmented reality experience in which multiple people can collaborate or participate.

Figure 5:
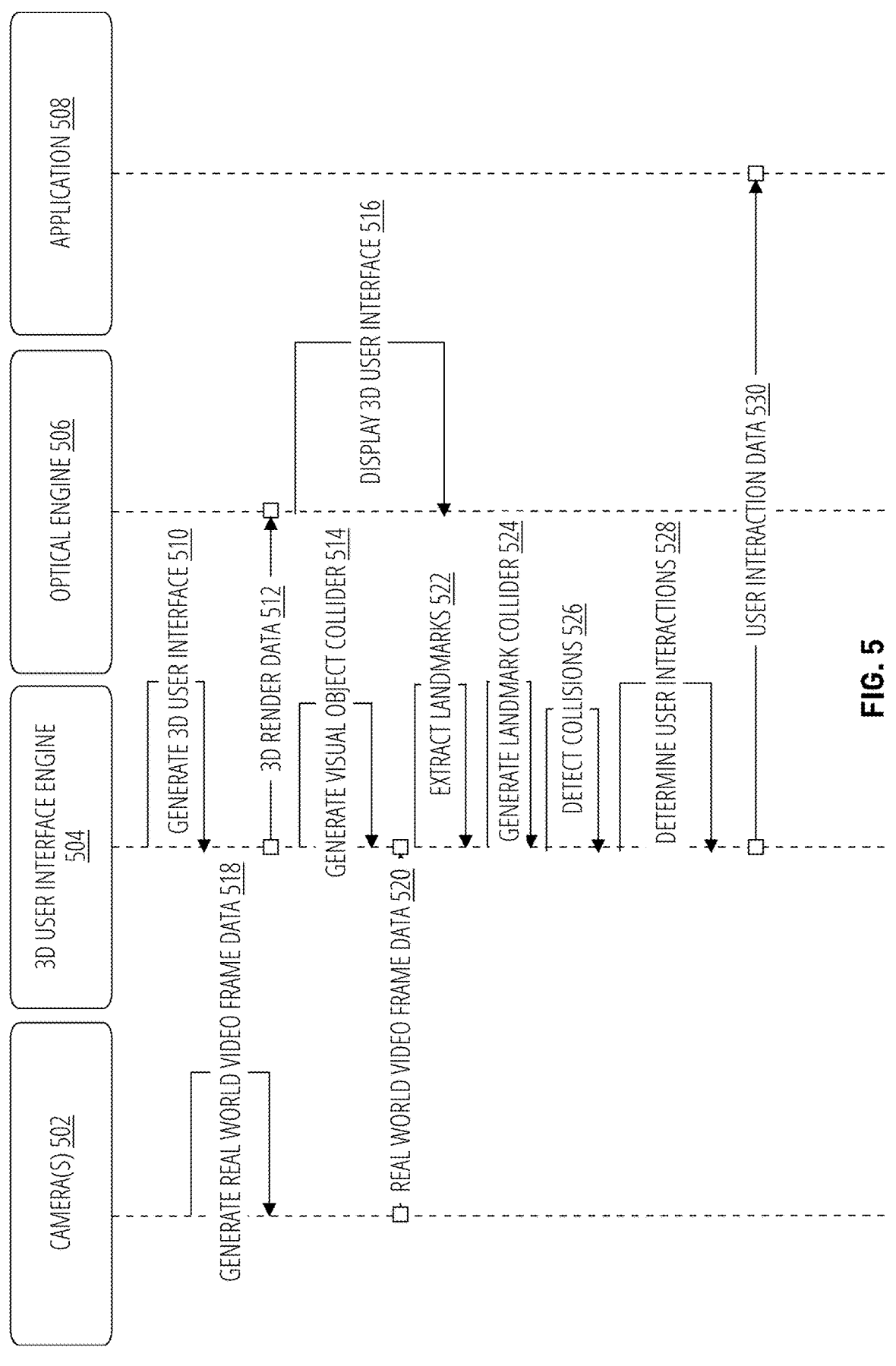
FIG. 5 illustrates a 3D user interface generation and utilization process in accordance with some examples.
Figure 6:
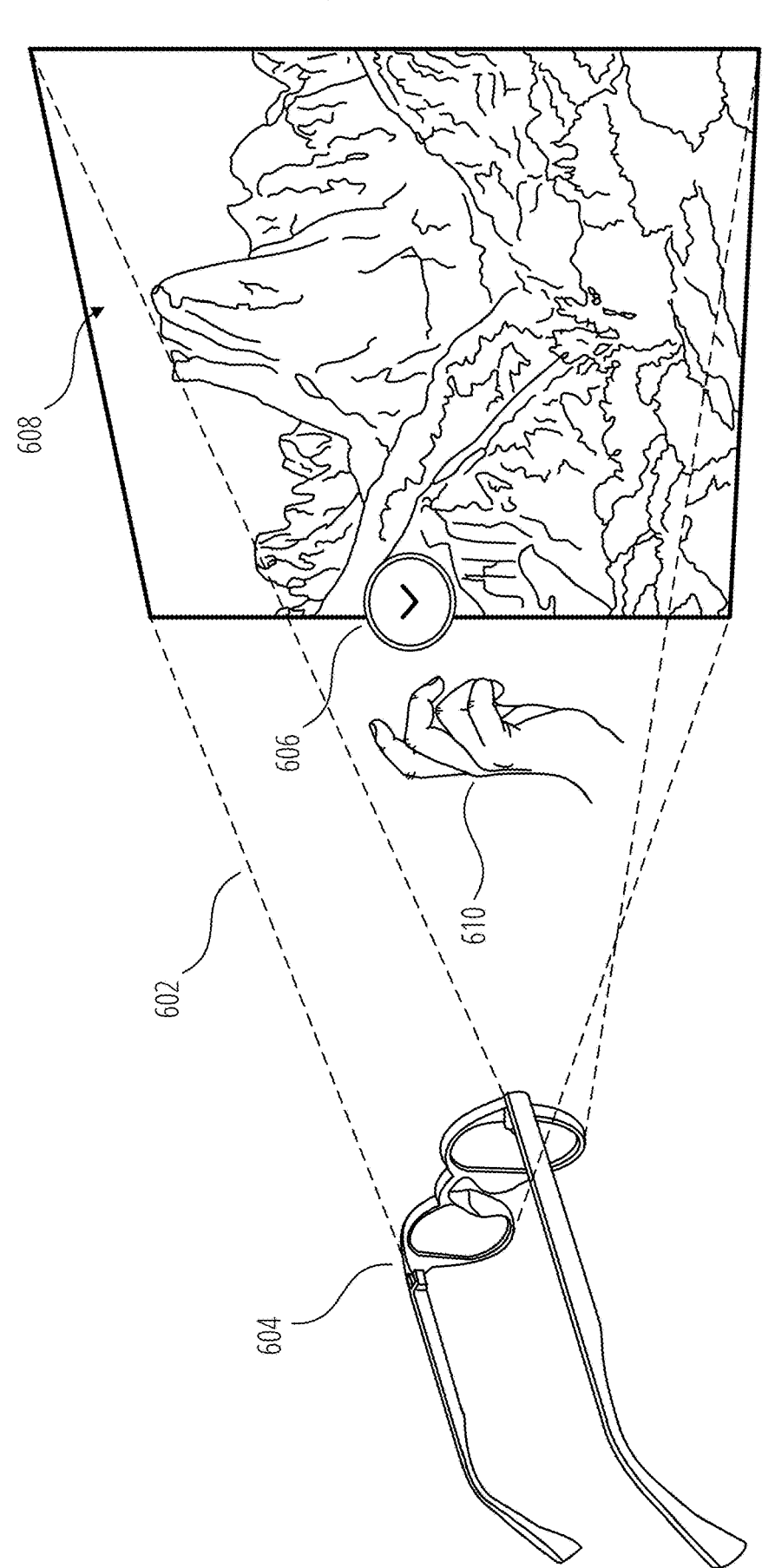
FIG. 6 illustrates a 3D user interface of glasses in accordance with some examples.

Referring now FIG. 5 and FIG. 6, FIG. 5 depicts a sequence diagram of an example 3D user interface process and FIG. 6 depicts a 3D user interface 602 of glasses 604 in accordance with some examples. During the process, a 3D user interface engine 504 generates 510 the 3D user inter- face 602 including one or more virtual objects 606 that constitute interactive elements of the 3D user interface 602. A virtual object may be described as a solid in a 3D geometry having values in 3-tuples of X (horizontal), Y (vertical), and Z (depth). A 3D render of the 3D user interface 702 is generated and 3D render data 512 is com- municated to an optical engine 506 of the glasses 604 and displayed 516 to a user of the glasses 604. The 3D user interface engine 504 generates 514 one or more virtual object colliders for the one or more virtual objects. One or more cameras 502 of the glasses 604 generate 518 real world video frame data 520 of the real world 608 as viewed by the user of the glasses 604. Included in the real world video frame data 520 is hand position video frame data of one or more of the user's hands 610 from a viewpoint of the user while wearing the glasses 604 and viewing the projection of the 3D render of the 3D user interface 602 by the optical engine 506. Thus the real world video frame data 520 include hand location video frame data and hand position video frame data of the user's hands 610 as the user makes movements with their hands. The 3D user interface engine 504 utilizes the hand location video frame data and hand position video frame data in the real world video frame data 520 to extract landmarks 522 of the user's hands from the real world video frame data 520 and generates 524 landmark colliders for one or more landmarks on one or more of the user's hands. The landmark colliders are used to determine user interactions between the user and the virtual object by detecting collisions 526 between the landmark colliders and respective visual object colliders of the virtual objects. The collisions are used by the 3D user interface engine 504 to determine user interactions 528 by the user with the virtual objects. The 3D user interface engine 504 communicates user interaction data 530 of the user interactions to an application 508 for utilization by the application 508.

In some examples, the application 508 performs the functions of the 3D user interface engine 504 by utilizing various APIs and system libraries to receive and process the real world video frame data 520 and instruct the optical engine 506.

In some examples, a user wears one or more sensor gloves on the user's hands that generate sensed hand position data and sensed hand location data that is used to generate the landmark colliders. The sensed hand position data and sensed hand location data are communicated to the 3D user interface engine 504 and used by the 3D user interface engine 504 in lieu of or in combination with the hand location video frame data and hand position video frame data to generate landmark colliders for one or more land- marks on one or more of the user's hands.

Figure 7:
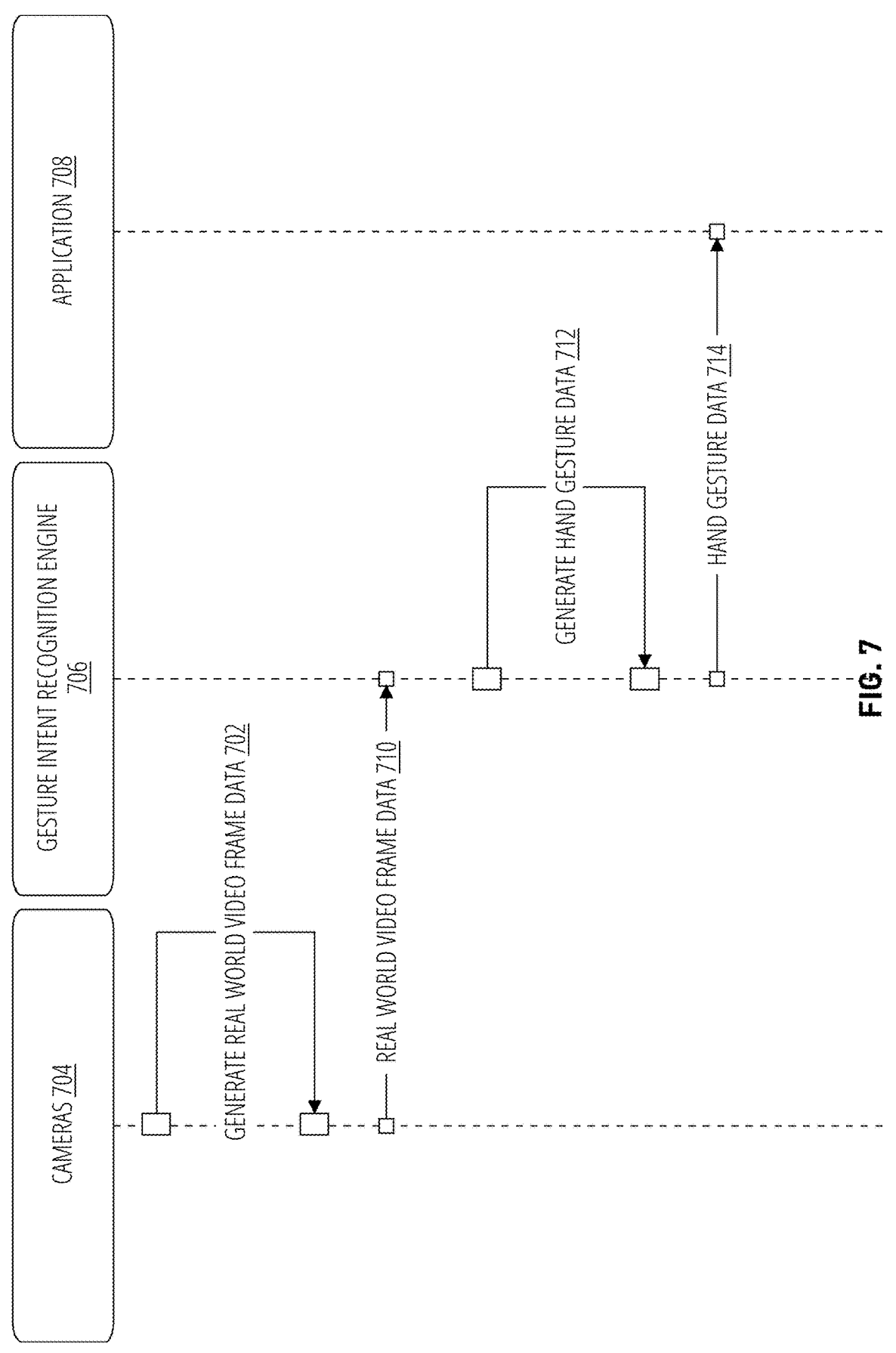
FIG. 7 depicts a sequence diagram of an example 3D user interface process in accordance with some examples.

FIG. 7 depicts a sequence diagram of an example 3D user interface process in accordance with some examples. One or more cameras 704 of the glasses 100 generate 602 real world video frame data 710 of a real world as viewed by a user of the glasses 100. Included in the real world video frame data 710 is hand position video frame data of one or more of the user's hands from a viewpoint of the user while wearing the glasses 100 and viewing the real world through the glasses 100. Thus real world video frame data 710 includes hand location video frame data and hand position video frame data of the user's hands as the user makes movements with their hands. The gesture intent recognition engine 706 utilizes the hand location video frame data and hand position video frame data in the real world video frame data 710 to generate hand gesture data 712 hand gesture data including hand gesture categorization information indicating one or more hand gestures being made by the user. The gesture intent recognition engine 706 communicates the hand ges- ture data 714 to an application 708 that utilized the hand gesture data 714 as an input from a user interface.

In some examples, the application 708 performs the functions of the gesture intent recognition engine 706 by utilizing various APIs and system libraries to receive and process the real world video frame data 710 from the one or more cameras 704 to determine the hand gesture data 714.

In some examples, a user wears one or more sensor gloves on the user's hands that generate sensed hand position data and sensed hand location data that are used to generate hand gesture data 712. The sensed hand position data and sensed hand location data are communicated to the gesture intent recognition engine 706 in lieu of or in combination with the hand location video frame data and hand position video frame data to generate hand gesture data 712.

The subject technology provides a hybrid pinch detection system for AR devices (e.g., glasses 100, client device 328, and the like) using multi-input sources. The pinch gesture is a fundamental component of user interaction in augmented reality (AR) devices. This gesture, understood as the closing movement between the thumb and index fingertips of a given user, enables interface control and object manipulation in an AR environment. An objective of techniques described herein is to accurately detect the initiation of a pinch e.g., the moment when the two fingers make contact, and maintain awareness of this closed state until such fingers are separated.

To achieve this, a sophisticated and robust detection system is enabled by the embodiments described herein. The subject system, therefore, can provide precise, stable, and low-latency pinch recognition. In an implementation, the subject system's functions include:

1. Accurately predicting state transitions (e.g., from open to closed, and vice versa) with high precision.

2. Maintaining stability in various pinch states (e.g., held or released) even under challenging conditions.

Examples of the aforementioned challenging conditions can include:

Self-occlusion, where parts of the hand obstruct the view of the fingers

Various hand orientations

Rapid hand movements resulting in motion blur

The ability to perform reliably under these diverse circumstances is crucial for ensuring a seamless and intuitive user experience in AR applications.

Embodiments of the subject technology provide implementations of a modular neural network-based pipeline that leverages multiple input sources available on a given AR device. This pipeline can incorporate data from various sensors, input, or data source, including, but not limited to, the following:

1. Multiple camera streams

2. Hand skeleton model

3. Joint occlusion information

4. Other relevant input sources

Moreover, embodiments of the subject technology can train a modular machine learning model(s) to integrate diverse features in an advantageous manner. In particular, a goal of this integration is to enable the different components, including the modular machine learning model, as described further herein, to compensate for and eliminate errors inherent in each individual input source. This approach can provide a more robust and accurate pinch detection system by combining the strengths of various input modalities while mitigating their individual weaknesses.

Additionally, embodiments of the subject technology introduce an advanced pinch detection system that utilizes a multi-faceted pipeline architecture. The system is comprised of multiple interconnected components, including machine learning components, each designed to process and analyze different aspects of the pinch gesture. One feature of this architecture is its ability to leverage various multi-modal inputs that are integrated into the AR device's perception system. By harnessing these diverse data sources, the subject technology aims to create a more comprehensive and accurate pinch detection mechanism, capitalizing on the existing sensory capabilities of AR devices.

Figure 8:
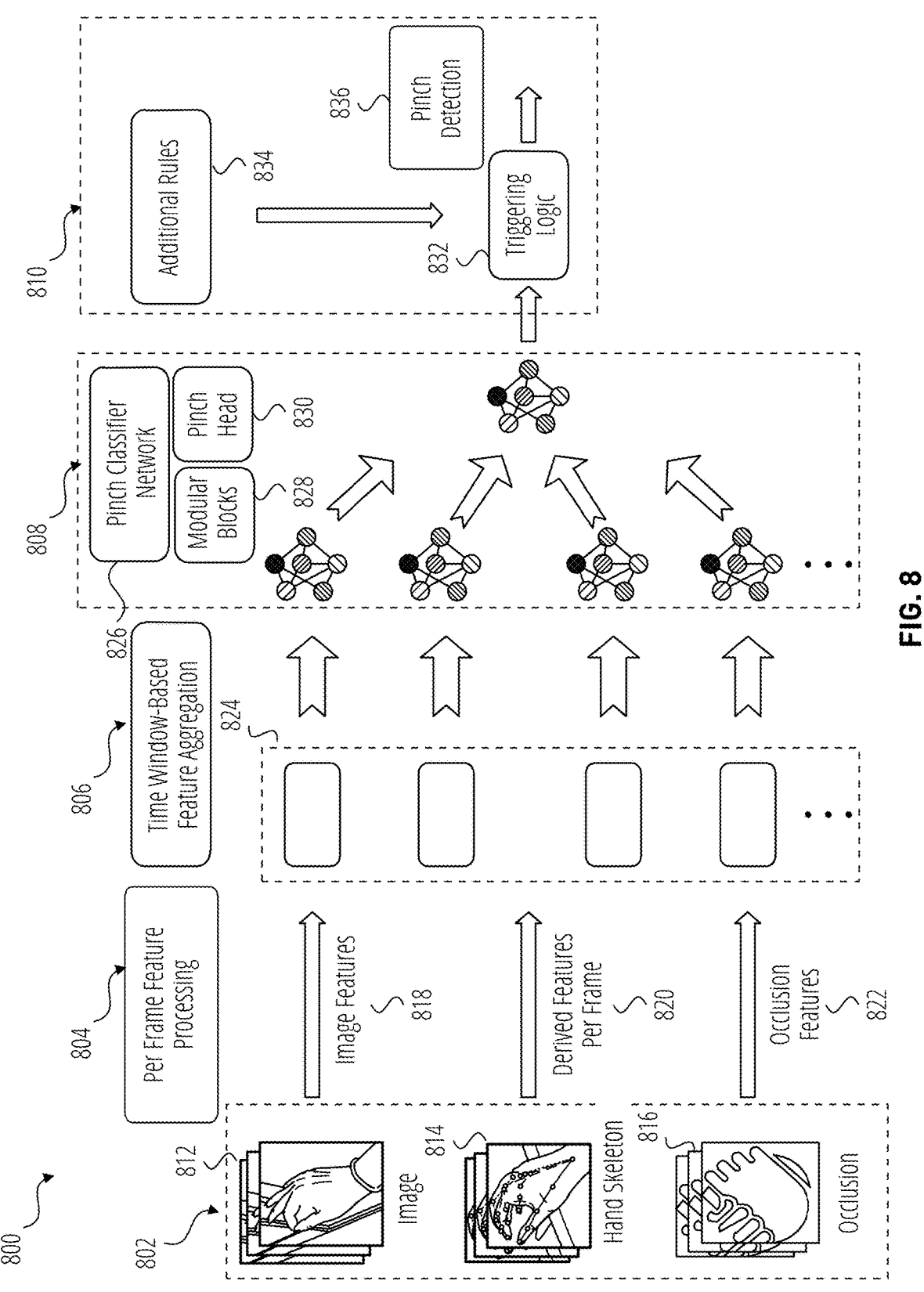
FIG. 8 illustrates an example of a system architecture that illustrates a processing flow for performing pinch detection in accordance with an embodiment of the subject technology.

FIG. 8 illustrates an example of a system architecture 800 that illustrates a processing flow for performing pinch detection in accordance with an embodiment of the subject technology. In an implementation, system architecture 800 can be implemented by one or more of the components discussed in FIG. 5, FIG. 6, or FIG. 7, which are provided by an AR device including, for example, glasses 100, glasses 604, or client device 328. Further, application 404, application 508, or application 708 can work in conjunction with system architecture 800 to provide various user interactions based on a detected pinch gesture(s).

As illustrated, an input pipeline 802 ingests multiple inputs from the AR device's sensory array and other data sources, including:

1. Visual data from an arbitrary number of camera streams (e.g., four distinct camera streams) corresponding to a set of images 812

2. A hand skeleton model(s), offering a structural representation of the user's hand corresponding to a set of hand skeletons 814 (e.g., one or more hand skeleton models). For example, a hand skeleton model is a digital representation of the structure and positioning of a user's hand, including the joints and bones.

3. Occlusion features, which provide information about potential obstructions corresponding to a set of occlusion information 816

In an example, a sensory array refers to a collection of sensors utilized to capture data related to the real-world environment. These sensors work together to provide comprehensive input for the AR device, enabling it to accurately perceive and interpret the surrounding physical space. A typical AR sensory array may include:

1. Cameras: For visual input and image recognition

2. Depth sensors: To measure distances and create 3D maps of the environment

3. Inertial Measurement Units (IMUs): Including accelerometers and gyroscopes for motion tracking 4. GPS: For outdoor location tracking 5. Microphones: For audio input and voice commands 6. Light sensors: To adjust display brightness based on ambient lighting conditions The data collected by this sensory array feeds into system architecture 800, via input pipeline 802, to enable accurate positioning of virtual content within the real world (e.g., real world 608).

Using these various inputs, the subject system generates additional derived features for each incoming frame during per frame feature processing stage 804. In an example, such a preprocessing step allows the system architecture 800 to extract and synthesize relevant information from the raw input data, creating a rich set of features that can be used for accurate pinch detection in subsequent stages.

In an example, a set of image features 818 determined based on set of images 812 can include one or more of the following:

1. Contour and silhouette: The outline of the hand can be extracted to determine overall hand shape and orientation.

2. Skin color and texture: These can be used to segment the hand from the background and track its movement.

3. Key points: Specific landmarks on the hand such as fingertips, knuckles, and the center of the palm can be identified.

4. Depth information: If depth sensors are used alongside regular cameras, 3D features of the hand can be extracted.

5. Motion vectors: By analyzing consecutive frames, the movement direction and speed of different hand parts can be determined.

6. Finger spacing: The relative distances between fingers can be measured to recognize specific gestures.

7. Hand pose: The overall configuration of the hand, including finger flexion and extension, can be estimated.

8. Scale and rotation: Changes in hand size and orientation across frames can be used for tracking.

9. Texture patterns: Unique patterns on the skin, like creases or veins, can aid in precise tracking.

10. Edge features: Sharp changes in intensity or color can help in detecting finger boundaries and hand shape.

In an example, a set of derived features per frame 820 determined based on the set of hand skeletons 814 can include the following:

1. Joint angles: The angles between different bones in the hand, which can be used to recognize gestures and hand poses.
2. Finger length and proportions: Measurements of individual finger lengths and their ratios, which can be used for hand identification or customizing virtual objects.
3. Hand orientation: The overall orientation of the hand in 3D space, useful for interaction with virtual objects.
4. Fingertip positions: The precise locations of fingertips, which can be used for fine-grained interactions like virtual typing or drawing.
5. Palm center and size: The location of the palm center and its dimensions, which can be used for hand tracking and gesture recognition.
6. Bone velocities and accelerations: The speed and acceleration of hand movements, useful for predicting motion and implementing physics-based interactions.
7. Hand volume: The overall volume occupied by the hand, which can be used for collision detection with virtual objects.
8. Curvature of the palm: The shape of the palm, which can be used for more accurate hand pose estimation.
9. Inter-finger distances: The distances between fingers, which can be used for recognizing specific gestures or grips.
10. Wrist position and orientation: The location and angle of the wrist relative to the hand, which can provide context for hand movements and gestures.

In an example, a set of occlusion features 822 determined based on set of occlusion information 816 can include the following:

1. Depth ordering: The relative depth of objects in the scene, indicating which objects are in front of or behind others.
2. Object boundaries: The edges where one object occludes another, helping to define the shape and extent of objects.
3. Partial visibility: The degree to which objects are partially hidden by others, useful for understanding spatial relationships.
4. Temporal occlusion: Changes in occlusion over time as objects or the viewer move, providing information about motion and scene dynamics.
5. Self-occlusion: Parts of an object occluding other parts of the same object, helping to infer 3D structure.
6. Transparency effects: Areas where objects are partially visible through semi-transparent occluders, useful for rendering realistic AR overlays.
7. Shadow occlusion: Information about light sources and object positions based on cast shadows.
8. Occlusion masks: Binary or probabilistic maps indicating which parts of the scene are occluded, useful for AR content placement.
9. Occlusion boundaries: The precise locations where occlusion occurs, which can be used for edge detection and object segmentation.
10. Occlusion recovery: Estimating the appearance of occluded regions based on surrounding context and prior knowledge.

To more fully capture the temporal dynamics of the pinch gesture, the system employs a sophisticated feature aggregation process corresponding to time window-based feature aggregation stage 806. The time window-based feature aggregation stage 806 operates on the per-frame features described earlier, utilizing a sliding window approach to analyze the gesture's evolution over time. In an example, a time window can refer to a sliding temporal segment (e.g., based on a period of time) that aggregates features from multiple consecutive frames.

The sliding window technique employed by time window-based feature aggregation stage 806 allows the system architecture 800 to consider a sequence of frames, rather than isolated snapshots. This approach is crucial for understanding the continuous nature of the pinch gesture and its progression.

Within a sliding window, the system architecture 800, in time window-based feature aggregation stage 806, can apply one or more aggregators to the per-frame features to determine a set of aggregated features 824. These aggregators can include:

Polynomial fitting: This technique helps to model the trajectory of the pinch gesture over time, potentially capturing subtle variations in the movement, and involves fitting a polynomial function to the feature values over the time window. It can capture trends and patterns in the data. Polynomial fitting might be particularly relevant for tracking the trajectory of fingers during the pinch gesture, potentially aiding in the detection of pinch-and-drag movements.

Mean calculations: By computing average values across the window, the system can identify overall trends in the gesture's execution. In particular, determining the average of feature values across the time window provides a simple but effective way to smooth out fluctuations. Mean calculation might be useful for smoothing out rapid fluctuations in finger positions, helping to maintain stable pinch states during complex movements.

Statistical descriptors: These provide additional insights into the distribution and variability of the features within the window. For example, such statistical descriptors can include measures like variance, standard deviation, or percentiles, which provide information about the distribution of feature values within the window. Statistical descriptors can be valuable for capturing the variability in finger positions during a pinch, potentially helping to distinguish between intentional pinches and unintended finger movements.

By employing such aggregation techniques, the system architecture 800 can extract meaningful temporal patterns from the raw per-frame data in time window-based feature aggregation stage 806. This allows for a more nuanced understanding of the pinch gesture, accounting for factors such as speed, consistency, and subtle variations in execution.

In an example, such temporal analysis enhances the system's ability to accurately detect and interpret pinch gestures, contributing to a more robust and responsive user interface in AR applications.

As further shown, in modular network processing phase 808, pinch classifier network 826 can process the set of aggregated features 824. The pinch classifier network 826 forms an important component of the pinch detection system, utilizing a modular architecture to process and analyze the set of aggregated features 824. The pinch classifier network 826 can include several key elements working in concert to achieve accurate pinch detection. In an implementation, modular blocks 828 and pinch head 830 are components that are included as part of pinch classifier network 826.

At the core of the modular network processing phase 808 are multiple modular components corresponding to modular blocks 828. Each of these blocks, in an example, is specifically designed to handle feature extraction from the diverse aggregated feature sets of the set of aggregated features 824. These modular components operate independently, allowing for specialized processing of different types of input data, such as image features, skeleton data, or occlusion information, including performing another aggregation of the different types of input data. For example, a given modular component can perform a feature extraction of set of aggregated features 824 where features related to image features, hand skeleton features, or occlusion features are extracted and then combined in one or more data sets (e.g., a set of extracted features). Moreover, each modular component can provide a different combination of the aforementioned features, if appropriate, to provide more robust pinch detection. In yet another example, each modular component can perform a particular feature extraction for one particular type of feature (e.g., one of the image features, hand skeleton features, or occlusion features), and subsequently, another modular component performs a process for combining each type of extracted feature in a set of extracted features. Although in the example of FIG. 8, four modular blocks are shown (e.g., 1) one for extracting image features, 2) one for extracting hand skeleton features, 3) one for extracting occlusion features, and 4) one for combining the aforementioned extracted features), it is understood that an arbitrary number of modular blocks can be provided in modular blocks 828 and still be within the scope of the subject technology.

In a modular neural network-based pipeline, it can be understood that different machine learning models or algorithms can be used within the pinch classifier network 826.

In an example, a modular approach offers several advantages:

1. Flexibility: Each block can be optimized for its specific input type.
2. Scalability: New feature types can be incorporated by adding additional modules.
3. Robustness: The system can maintain performance even if one input source is compromised.

After the modular blocks 828 extract features, these (combined) extracted features are then passed to the final stage of the modular network processing phase 808: a pinch detection head corresponding to pinch head 830. This component plays a critical role in synthesizing the information from all the separate extractors of the modular blocks 828.

A pinch detection head in AR and pinch gesture detection can refer to a specific point or region that serves as the primary focus for detecting and tracking pinch gestures. Such a pinch detection head is typically located at the point where the thumb and index finger meet during a pinch action, and is crucial for accurately recognizing the initiation, duration, and completion of a pinch gesture in AR systems such as system architecture 800.

The primary function of the pinch detection head is to combine the extracted features in a way that reduces noise and minimizes errors. By integrating information from multiple sources, the pinch head 830 can compensate for weaknesses or inaccuracies in individual feature extractors. This fusion of data allows for a more comprehensive and accurate assessment of the pinch gesture.

The output of the pinch detection head is a probability score. This score represents a quantitative measure of how likely it is that a pinch occurred in the current frame. By producing a probability rather than a binary decision, the system architecture 800 provides a nuanced interpretation of the gesture, potentially allowing for more sophisticated interaction mechanisms in AR applications.

This probability score is generated for each frame processed by the system architecture 800. This continuous evaluation enables the detection of pinch gestures in real-time, supporting responsive and intuitive user interactions in AR environments.

The modular architecture of the modular network processing phase 808 in system architecture 800 offers advantages in terms of training flexibility and system robustness. In particular, this approach enables separate training of individual network modules, which brings several benefits to the overall system. For example, each of the modular blocks 828 and the pinch head 830 can be trained separately as discussed in further detail below.

By training network modules independently, the system architecture 800 can be optimized to handle a wider range of edge cases. Edge cases in pinch detection might include scenarios such as partial occlusion of fingers, unusual hand orientations, or rapid movements. Each module can be specifically trained to excel in detecting these challenging situations, enhancing the subject system's overall performance.

This separate training approach can also contribute to increased stability of the system architecture 800. For example, by fine-tuning each module for its specific task, the system becomes more resilient to variations in input data. For instance, one module from modular blocks 828 might be optimized for image-based features, while another module from modular blocks 828 focuses on skeleton-based features. Such a specialization allows each module to maintain performance even when faced with challenging input conditions. It is understood that an arbitrary number of modular blocks can be provided in modular blocks 828 and still be within the scope of the subject technology.

The ability to train modules separately also provides greater flexibility in the development and improvement of the system. Developers can focus on enhancing specific aspects of the pinch detection pipeline without needing to retrain the entire network. Such a modular approach facilitates easier updates and refinements to the system over time.

Furthermore, the separate training of modules allows for better handling of multi-modal inputs. Each module can be trained on its specific input type (e.g., camera streams, hand skeleton data, occlusion features), ensuring optimal processing of diverse data sources. When combined in a final pinch detection head (e.g., pinch head 830), these separately trained modules contribute to a more comprehensive and accurate pinch detection system.

The pinch detection head (e.g., pinch head 830) functions as a reference point for the gesture recognition algorithm, allowing it to precisely track the pinching motion and distinguish it from other hand movements. By monitoring the position and movement of this point, AR systems, including system architecture 800, can determine when a pinch gesture begins, how it progresses, and when it ends. This information is then used to initiate appropriate interactions within the AR environment, such as selecting, scaling, or manipulating virtual objects (e.g., as described in part in FIG. 6 above).

In summary, the ability to train network modules separately enhances the capability of system architecture 800 to handle edge cases, improves overall stability, and provides flexibility for ongoing development and optimization of the pinch detection pipeline provided by system architecture 800.

Moving to detection and output phase 810, triggering logic 832 interprets the probability scores generated by the pinch classifier network 826 (e.g., provided as output from pinch head 830 from the modular network processing phase 808). This component (e.g., triggering logic 832) is responsible for identifying the precise moments when a pinch gesture begins and ends in an example, each of which can be provided as information included in a pinch detection 836. The pinch detection 836 can be provided to a given AR application for subsequent processing to facilitate one or more user interactions as described in examples of FIG. 5, FIG. 6, or FIG. 7.

In more detail, a pinch gesture in an AR user interface can be used for:

Object Selection: Users can pinch to select virtual objects in the AR environment.

Object Manipulation: Once selected, objects can be manipulated through pinch-and-drag movements, enabling a user to move or reposition virtual objects.

Interface Navigation: Pinch gestures can be used to navigate through menus or scroll through content in the AR interface.

Zoom Control: In some AR applications, pinching can be used to zoom in or out of the virtual environment or specific AR elements.

Triggering Actions: The pinch gesture can serve as a "click" or "activate" action for buttons or interactive elements in the AR interface.

One function of the triggering logic 832 is to analyze the continuous stream of probability scores produced for each frame from modular network processing phase 808. By examining these scores, the system architecture 800 can determine when the fingers have entered into a pinching state. In an example, such a moment is characterized by a significant increase in the probability score (e.g., an increase in probability score exceeding a particular threshold from a previous probability score), indicating a high likelihood that the thumb and index finger have made contact.

Similarly, the triggering logic 832 is also tasked with detecting when the pinch gesture has been released. This is typically signaled by a notable decrease (e.g., decrease in probability score exceeding a particular threshold from a previous probability score) in the probability score, suggesting that the fingers have separated and are no longer in a pinched position.

The use of a dedicated triggering logic in the form of triggering logic 832, separate from the classifier network of modular network processing phase 808, allows for more nuanced control over pinch detection. In an implementation, triggering logic 832 can incorporate additional rules 834 or thresholds to ensure that brief fluctuations in probability scores do not result in false detections as discussed further below. This approach enhances the ability of system architecture 800 to maintain stable pinch states, even in challenging scenarios such as rapid hand movements or partial occlusions.

By precisely identifying the start and end of pinch gestures, triggering logic 832 enables the AR system to respond accurately to user inputs. This accuracy is crucial for providing a responsive and intuitive user interface, where the timing of pinch detections can significantly impact the user experience in AR applications.

The following discussion relates to training of components of system architecture 800.

In an example, a training process for the pinch detection system of system architecture 800 is structured into two distinct stages, each focusing on different components of the subject system.

In the first stage, the modular classifier network corresponding to pinch classifier network 826 undergoes training. This pinch classifier network 826, including various building blocks responsible for feature extraction corresponding to modular blocks 828, forms the core of the pinch detection system. The training of this network can involve exposing it to a diverse dataset of pinch gestures, allowing it to learn patterns and features associated with different aspects of the pinch action. This stage is crucial for developing the ability of system architecture 800 to accurately process and interpret the multi-modal inputs it receives.

The second stage of training focuses on the triggering logic 832 component. During this second phase, the parameters of the triggering logic 832 are learned. The triggering logic 832 is responsible for interpreting the probability scores output by the pinch classifier network 826 and determining the precise moments when a pinch gesture begins and ends (e.g., included as information in pinch detection 836). By training triggering logic 832 separately, the system architecture 800 can fine-tune its ability to accurately detect state transitions in the pinch gesture.

This two-stage approach to training offers several advantages:

1. It allows for specialized optimization of each component. The pinch classifier network 826 can be trained to excel at feature extraction and probability estimation, while the triggering logic 832 can be optimized for accurate state detection.

2. It provides flexibility in the training process. If improvements are needed in either the classification or the triggering aspects of the system, the relevant stage can be retrained without necessarily affecting the other.

3. It potentially allows for better handling of edge cases. The triggering logic 832 can be trained to interpret probability scores in a way that accounts for challenging scenarios that the classifier network might encounter.

By separating the training into these two stages, the system architecture 800 can achieve a balance between accurate feature extraction and precise gesture detection, contributing to a more robust and reliable pinch detection mechanism for AR applications.

The pinch detection pipeline provided by system architecture 800 incorporates additional rules 834 based on hand pose and velocity to enhance its robustness and accuracy. These additional rules 834 serve as supplementary mechanisms to refine the detector's performance across various scenarios, which can include at least the following:

Hand Orientation-Based Feature Weighting: One key rule involves adjusting the weights of skeleton-based and image-based features according to the hand's orientation. This adaptive approach allows the system to optimize its detection strategy based on the current hand pose. For instance, when the hand is in certain orientations, the reliability of skeleton-based features might be higher, while in other positions, image-based features could provide more accurate information. By dynamically adjusting these weights, the system architecture 800 can maintain high detection accuracy across a wide range of hand orientations.

Velocity-Based False Positive Filtering: Another important rule focuses on filtering out false positive detections during high-velocity hand movements. This is particularly crucial as rapid hand motions can sometimes lead to misinterpretations in the detection process. By implementing this rule, the system architecture 800 can distinguish between genuine pinch gestures and artifacts caused by quick hand movements, thereby reducing the occurrence of false positives and improving overall detection reliability.

These rules work in conjunction with the core neural network-based pipeline to create a more comprehensive and robust pinch detection system. Such rules can address specific challenges that might arise in real-world usage scenarios, such as varying hand orientations and rapid hand movements, which can occur in AR applications (e.g., application 404, application 508, or application 708). For example, triggering logic 832 can incorporate the aforementioned rule(s) provided by additional rules 834 to determine information related to a pinch gesture, which is provided as a pinch detection output corresponding to pinch detection 836.

The integration of these rules demonstrates a multifaceted approach to pinch detection, combining the power of machine learning with heuristic-based adjustments. This hybrid strategy enables the system architecture 800 to adapt to a broader range of user behaviors and environmental conditions, ultimately leading to a more stable and accurate pinch detection mechanism in AR devices.

The main advantages of the modular system can be summarized as follows:

Image-based Feature Precision: The system utilizes image-based features that offer frame-accurate detection with millimeter-level sensitivity. This high precision allows for detailed tracking of finger movements. However, these features are susceptible to certain environmental factors, which can potentially reduce prediction quality for individual frames in specific edge cases:

1. Motion blur
2. Lighting conditions
3. Occluded joints

Temporal Skeleton Feature Stability: Temporal skeleton features contribute to the system's robustness by maintaining stable pinch states (e.g., help prevent false triggers and maintain the integrity of held pinches). They are particularly effective during:

1. Fast hand movements
2. Orientation changes

Occlusion Detection: To ensure robust pinch detection, the system incorporates techniques to identify when fingers are obscured due to occlusion, which helps maintain accuracy by avoiding incorrect inferences when visual data is compromised. This is crucial because:

1. When fingers are invisible, the pinch state may not be accurately inferred
2. The system rejects potentially false predictions based on occlusion features Feature Fusion: The system architecture 800 employs a feature fusion technique that combines data from various modalities. By integrating multiple data streams, the system architecture 800 can compensate for weaknesses in any single modality, resulting in more reliable pinch detection. More specifically, this fusion approach:

Helps correct errors that may originate from individual modalities

Enhances overall accuracy by leveraging the strengths of different input sources This modular approach allows the system architecture 800 to leverage the strengths of different feature types while mitigating their individual weaknesses, resulting in a more robust and accurate pinch detection mechanism for AR applications.

The following discussion relates to discoverability.

The model's (e.g., pinch classifier network 826) behavior, sensitivity, and stability vary depending on hand orientation, particularly in certain regions. This variation can be observed in two specific scenarios:

1. Index Finger Orientation: When the index finger is pointing downwards at an angle between 70-90 degrees relative to the horizontal plane, the pinch detection becomes less sensitive. This reduced sensitivity in this particular orientation range may affect the accuracy of pinch gesture recognition when the hand is in this position.

2. Wrist to Middle Finger Base Joint Vector: The model's (e.g., pinch classifier network 826) sensitivity is also reduced when the vector between the wrist and the base joint of the middle finger falls within a range of −10 to 10 degrees compared to the horizontal plane. This narrow range of hand orientation results in decreased model sensitivity, potentially impacting pinch detection accuracy when the hand is held in this specific position.

In an example, such orientation-dependent variations in model performance highlight the challenges in maintaining consistent pinch detection across all possible hand positions, and also underscore the importance of the ability of system architecture 800 to adjust feature weights based on hand orientation, as mentioned in the earlier discussion about additional rules supporting the pipeline.

The behavior of the system architecture 800 can vary depending on the level of occlusion of the index finger and thumb:

1. Partial Occlusion: When either the index finger or thumb is partially occluded, the pinch detection becomes less sensitive. In this scenario, the system requires a larger distance between the fingers to trigger or release a pinch gesture. This reduced sensitivity is likely a precautionary measure to avoid false detections when the system has incomplete visual information about the finger positions.

2. Complete Self-Occlusion: In cases where there is complete self-occlusion of both the index and thumb fingertips, the system maintains the pinch state as it was in the non-occluded case. This means that if a pinch was detected before the occlusion occurred, the system will continue to recognize the pinch as being held, even when it can no longer visually confirm the finger positions. Similarly, if no pinch was detected before the occlusion, the system will not trigger a new pinch during the period of complete occlusion.

Such behaviors demonstrate the ability of system architecture 800 to handle various occlusion scenarios, balancing between maintaining gesture recognition and avoiding false detections when visual information is limited or unavailable.

FIG. 9 is a flowchart illustrating a method, according to certain example embodiments.

The method 900 may be embodied in computer-readable instructions for execution by one or more computer processors such that the operations of the method 900 may be performed in part or in whole by glasses 100. However, it shall be appreciated that at least some of the operations of the method 900 may be deployed on various other hardware configurations and the method 900 is not intended to be limited to glasses 100, or any components or systems mentioned above. For example, in some implementations, the operations described before can be performed by client device 328.

According to some examples, at operation 902, glasses 100 receives a set of inputs from multiple input sources.

At operation 904, glasses 100 determines a set of input features based on the set of inputs from the multiple input sources.

At operation 906, glasses 100 performs a time window-based aggregation on the set of input features to generate a set of aggregated features.

At operation 908, glasses 100 performs feature extraction, using a set of modular components of a modular classifier network, on the set of aggregated features to generate a set of extracted features.

At operation 910, glasses 100 generates, using a pinch detection head, a probability score indicating a likelihood of an occurrence of a pinch gesture based on the set of extracted features.

At operation 912, glasses 100 determines, using triggering logic, whether a pinch gesture has occurred based at least in part on the probability score.

At operation 914, glasses 604 provides a pinch detection output based at least in part on the determining.

In an embodiment, receiving the set of inputs from the multiple input sources comprises: receiving a set of images; receiving a set of hand skeleton models; and receiving a set of occlusion information.

In an embodiment, determining the set of input features based on the set of inputs from the multiple input sources comprises: determining a set of image features based on the set of images; determining a set of derived features per frame based on the set of hand skeleton models; and determining a set of occlusion features based on the set of occlusion information.

In an embodiment, performing the time window-based aggregation on the set of input features comprises: applying polynomial fitting on the set of input features; determining a set of averages on the set of input features; and determining a set of statistical descriptors on the set of input features.

In an embodiment, performing feature extraction, using the set of modular components of the modular classifier network, on the set of aggregated features comprises: performing, using a first modular component of the modular classifier network, a first feature extraction process to determine a first set of extracted features; performing, using a second modular component of the modular classifier network, a second feature extraction process to determine a second set of extracted features; performing, using a third modular component of the modular classifier network, a third feature extraction process to determine a third set of extracted features; and performing, using a fourth modular component of the modular classifier network, a feature aggregation process to combine at least some of the first set of extracted features, the second set of extracted features, and the third set of extracted features into a combined set of extracted features.

In an embodiment, generating, using the pinch detection head, the probability score indicating the likelihood of the occurrence of the pinch gesture comprises: combining the set of extracted features, the combined set of extracted features having a reduction in noise and errors compared to the set of extracted features prior to the combining.

In an embodiment, determining, using the triggering logic, whether the pinch gesture has occurred comprises: applying a set of additional rules to the set of extracted features; and generating information for the pinch detection output based at least in part on the applied set of additional rules and the probability score.

In an embodiment, the set of additional rules comprises hand orientation-based feature weighting and velocity-based false positive filtering.

In an embodiment, the pinch detection output is provided to an augmented reality application.

In an embodiment, the augmented reality application utilizes the pinch detection output to perform an object selection, object manipulation, interface navigation, or zoom control.

Figure 10:
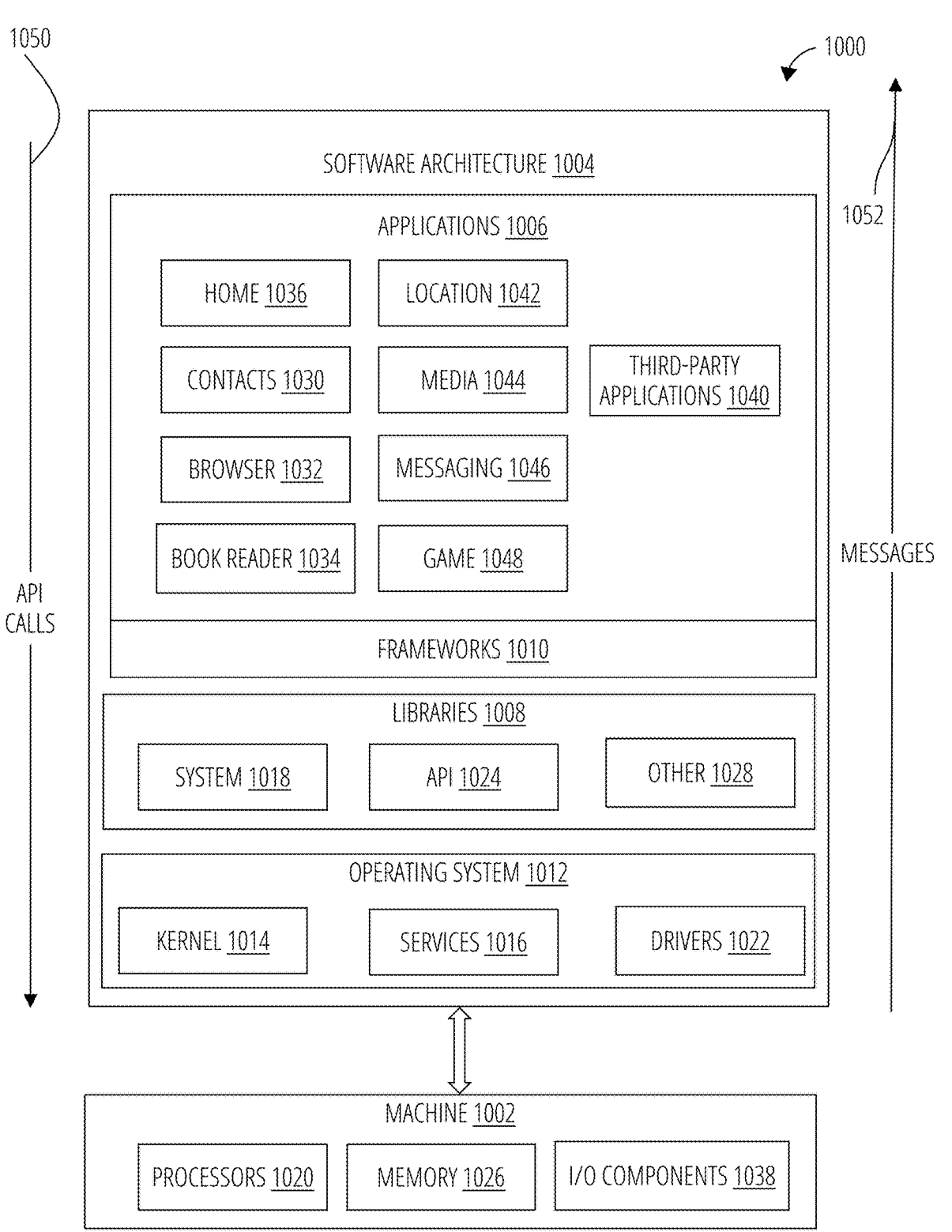
FIG. 10 is a block diagram showing a software architecture within which the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where individual layers provides a particular functionality. The software architecture 1004 includes layers such as an operating system 1012, libraries 1008, frameworks 1010, and Applications 1006. Operationally, the Applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLU-ETOOTH® Low Energy drivers, flash memory drivers, serial communication drivers (e.g., Universal Serial Bus (USB) drivers), WI-FI® drivers, audio drivers, power management drivers, and so forth.

The libraries 1008 provide a low-level common infrastructure used by the Applications 1006. The libraries 1008 can include system libraries 1018 (e.g., C standard library) that provide functions such as memory allocation functions, string manipulation functions, mathematic functions, and the like. In addition, the libraries 1008 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 1008 can also include a wide variety of other libraries 1028 to provide many other APIs to the Applications 1006.

The frameworks 1010 provide a high-level common infrastructure that is used by the Applications 1006. For example, the frameworks 1010 provide various graphical user interface (GUI) functions, high-level resource management, and high-level location services. The frameworks 1010 can provide a broad spectrum of other APIs that can be used by the Applications 1006, some of which may be specific to a particular operating system or platform.

In an example, the Applications 1006 may include a home application 1036, a contacts application 1030, a browser application 1032, a book reader application 1034, a location application 1042, a media application 1044, a messaging application 1046, a game application 1048, and a broad assortment of other Applications such as third-party Applications 1040. The Applications 1006 are programs that execute functions defined in the programs. Various programming languages can be employed to create one or more of the Applications 1006, structured in a variety of manners, such as object-oriented programming languages (e.g., Objective-C, Java, or C++) or procedural programming languages (e.g., C or assembly language). In a specific example, the third-party Applications 1040 (e.g., Applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party Applications 1040 can invoke the API calls 1050 provided by the operating system 1012 to facilitate functionality described herein.

Figure 11:
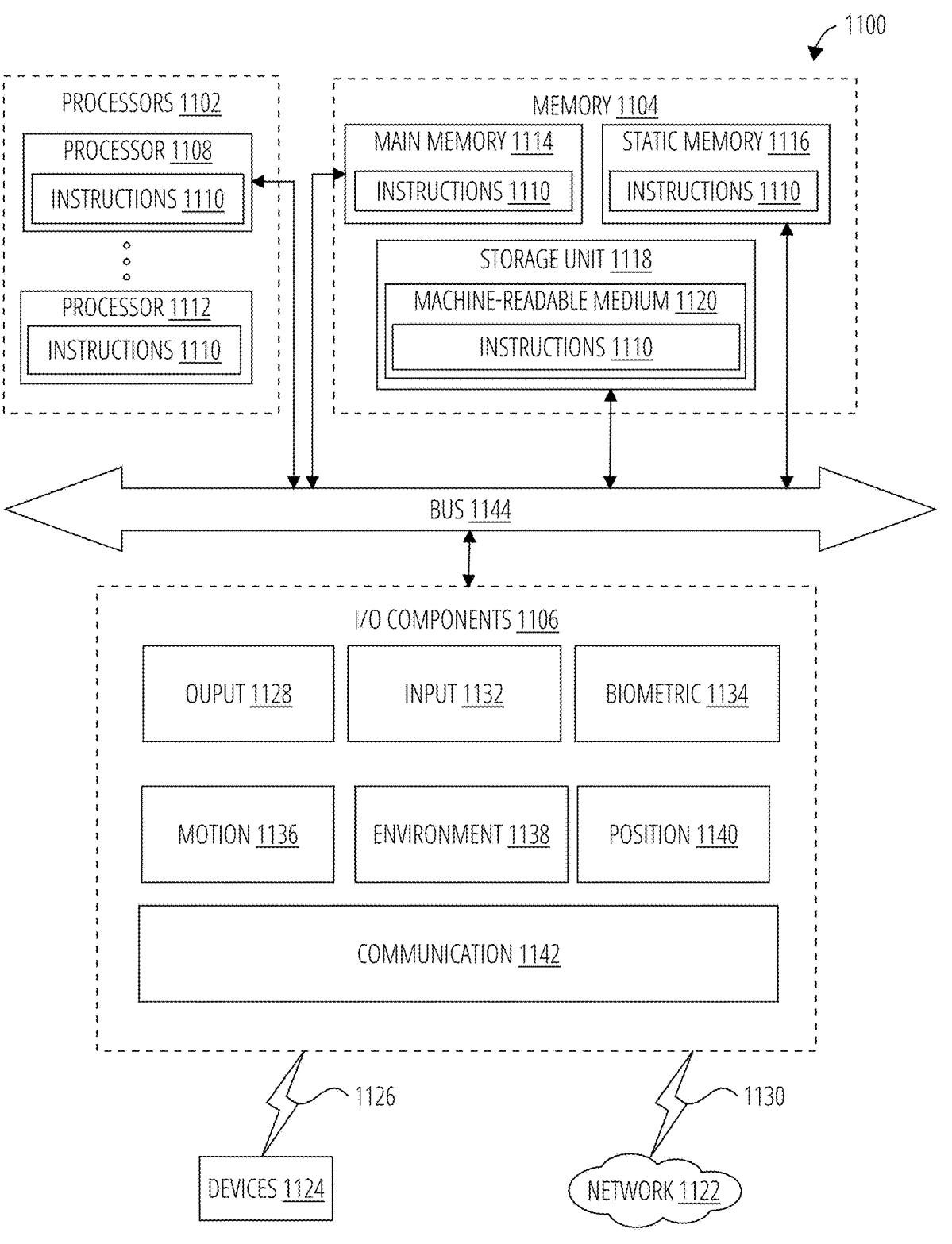
FIG. 11 is a diagrammatic representation of a machine, in the form of a computer system within which a set of instructions may be executed for causing the machine to perform any one or more of the methodologies discussed herein in accordance with some examples.

FIG. 11 is a diagrammatic representation of a machine 1100 within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while a single machine 1100 is illustrated, the term "machine" may also be taken to include a collection of machines that individually or jointly execute the instructions 1110 to perform any one or more of the methodologies discussed herein.

The machine 1100 may include processors 1102, memory 1104, and I/O components 1106, which may be configured to communicate with one another via a bus 1144. In an example, the processors 1102 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single core, a single processor with multiple cores (e.g., a multi-core processor), multiple processors with a single core, multiple processors with multiples cores, or any combination thereof.

The memory 1104 includes a main memory 1114, a static memory 1116, and a storage unit 1118, both accessible to the processors 1102 via the bus 1144. The main memory 1104, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within one or more of the processors 1102 (e.g., within the processor's cache memory), or any suitable combination thereof, during execution thereof by the networked system 300.

The I/O components 1106 may include a wide variety of components to receive input, provide output, produce output, transmit information, exchange information, capture measurements, and so on. The specific I/O components 1106 that are included in a particular machine will depend on the type of machine. For example, portable machines such as mobile phones may include a touch input device or other such input mechanisms, while a headless server machine will likely not include such a touch input device. It will be appreciated that the I/O components 1106 may include many other components that are not shown in FIG. 11. In various examples, the I/O components 1106 may include output components 1128 and input components 1132. The output components 1128 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1132 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1106 may include biometric components 1134, motion components 1136, environmental components 1138, or position components 1140, among a wide array of other components. For example, the biometric components 1134 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1136 include acceleration sensor components (e.g., accelerometer), gravitation sensor components, rotation sensor components (e.g., gyroscope), and so forth. The environmental components 1138 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1140 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1106 further include communication components 1142 operable to couple the networked system 300 to a network 1122 or devices 1124 via a coupling 1130 and a coupling 1126, respectively. For example, the communication components 1142 may include a network interface component or another suitable device to interface with the network 1122. In further examples, the communication components 1142 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1142 may detect identifiers or include components operable to detect identifiers. For example, the communication components 1142 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1142, such as location via Internet Protocol (IP) geolocation, location via Wi-Fi® signal triangulation, location via detecting an NFC beacon signal that may indicate a particular location, and so forth.

The various memories (e.g., memory 1104, main memory 1114, static memory 1116, and/or memory of the processors 1102) and/or storage unit 1118 may store one or more sets of instructions and data structures (e.g., software) embodying or used by any one or more of the methodologies or functions described herein. These instructions (e.g., the instructions 1110), when executed by processors 1102, cause various operations to implement the disclosed examples.

The instructions 1110 may be transmitted or received over the network 1122, using a transmission medium, via a network interface device (e.g., a network interface component included in the communication components 1142) and using any one of a number of well-known transfer protocols (e.g., hypertext transfer protocol (HTTP)). Similarly, the instructions 1110 may be transmitted or received using a transmission medium via the coupling 1126 (e.g., a peer-to-peer coupling) to the devices 1124.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method, comprising:
receiving a set of inputs from multiple input sources, the receiving the set of inputs from the multiple input sources comprising:
receiving a set of images;
receiving a set of hand skeleton models; and
receiving a set of occlusion information;
determining a set of input features based on the set of inputs from the multiple input sources;
performing a time window-based aggregation on the set of input features to generate a set of aggregated features;
performing feature extraction, using a set of modular components of a modular classifier network, on the set of aggregated features to generate a set of extracted features;
generating, using a pinch detection head, a probability score indicating a likelihood of an occurrence of a pinch gesture based on the set of extracted features;
determining, using triggering logic, whether a pinch gesture has occurred based at least in part on the probability score; and
providing a pinch detection output based at least in part on the determining.

2. The method of claim 1, wherein determining the set of input features based on the set of inputs from the multiple input sources comprises:
determining a set of image features based on the set of images;
determining a set of derived features per frame based on the set of hand skeleton models; and
determining a set of occlusion features based on the set of occlusion information.

3. The method of claim 1, wherein performing the time window-based aggregation on the set of input features comprises:
applying polynomial fitting on the set of input features;
determining a set of averages on the set of input features; and
determining a set of statistical descriptors on the set of input features.

4. The method of claim 1, wherein performing feature extraction, using the set of modular components of the modular classifier network, on the set of aggregated features comprises:
performing, using a first modular component of the modular classifier network, a first feature extraction process to determine a first set of extracted features;
performing, using a second modular component of the modular classifier network, a second feature extraction process to determine a second set of extracted features;
performing, using a third modular component of the modular classifier network, a third feature extraction process to determine a third set of extracted features; and
performing, using a fourth modular component of the modular classifier network, a feature aggregation process to combine at least some of the first set of extracted features, the second set of extracted features, and the third set of extracted features into a combined set of extracted features.

5. The method of claim 1, wherein generating, using the pinch detection head, the probability score indicating the likelihood of the occurrence of the pinch gesture comprises:
combining the set of extracted features, the combined set of extracted features having a reduction in noise and errors compared to the set of extracted features prior to the combining.

6. The method of claim 1, wherein determining, using the triggering logic, whether the pinch gesture has occurred comprises:
applying a set of additional rules to the set of extracted features; and
generating information for the pinch detection output based at least in part on the applied set of additional rules and the probability score.

7. The method of claim 6, wherein the set of additional rules comprises hand orientation-based feature weighting and velocity-based false positive filtering.

8. The method of claim 7, wherein the pinch detection output is provided to an augmented reality application.

9. The method of claim 8, wherein the augmented reality application utilizes the pinch detection output to perform an object selection, object manipulation, interface navigation, or zoom control.

10. A system comprising:
a processor; and
a memory including instructions that, when executed by the processor, cause the processor to perform operations comprising:
receiving a set of inputs from multiple input sources, the receiving the set of inputs from the multiple input sources comprising:
receiving a set of images;
receiving a set of hand skeleton models; and
receiving a set of occlusion information;
determining a set of input features based on the set of inputs from the multiple input sources;
performing a time window-based aggregation on the set of input features to generate a set of aggregated features;
performing feature extraction, using a set of modular components of a modular classifier network, on the set of aggregated features to generate a set of extracted features;

generating, using a pinch detection head, a probability score indicating a likelihood of an occurrence of a pinch gesture based on the set of extracted features;

determining, using triggering logic, whether a pinch gesture has occurred based at least in part on the probability score; and providing a pinch detection output based at least in part on the determining.

11. The system of claim 10, wherein determining the set of input features based on the set of inputs from the multiple input sources comprises:

determining a set of image features based on the set of images;

determining a set of derived features per frame based on the set of hand skeleton models; and determining a set of occlusion features based on the set of occlusion information.

12. The system of claim 10, wherein performing the time window-based aggregation on the set of input features comprises:

applying polynomial fitting on the set of input features;

determining a set of averages on the set of input features; and determining a set of statistical descriptors on the set of input features.

13. The system of claim 10, wherein performing feature extraction, using the set of modular components of the modular classifier network, on the set of aggregated features comprises:

performing, using a first modular component of the modular classifier network, a first feature extraction process to determine a first set of extracted features;

performing, using a second modular component of the modular classifier network, a second feature extraction process to determine a second set of extracted features;

performing, using a third modular component of the modular classifier network, a third feature extraction process to determine a third set of extracted features; and performing, using a fourth modular component of the modular classifier network, a feature aggregation process to combine at least some of the first set of extracted features, the second set of extracted features, and the third set of extracted features into a combined set of extracted features.

14. The system of claim 10, wherein generating, using the pinch detection head, the probability score indicating the likelihood of the occurrence of the pinch gesture comprises:

combining the set of extracted features, the combined set of extracted features having a reduction in noise and errors compared to the set of extracted features prior to the combining.

15. The system of claim 10, wherein determining, using the triggering logic, whether the pinch gesture has occurred comprises:

applying a set of additional rules to the set of extracted features; and generating information for the pinch detection output based at least in part on the applied set of additional rules and the probability score.

16. The system of claim 15, wherein the set of additional rules comprises hand orientation-based feature weighting and velocity-based false positive filtering.

17. The system of claim 16, wherein the pinch detection output is provided to an augmented reality application.

18. A non-transitory computer-readable medium comprising instructions, which when executed by a computing device, cause the computing device to perform operations comprising:

receiving a set of inputs from multiple input sources, the receiving the set of inputs from the multiple input sources comprising:

receiving a set of images;

receiving a set of hand skeleton models; and receiving a set of occlusion information;

determining a set of input features based on the set of inputs from the multiple input sources;

performing a time window-based aggregation on the set of input features to generate a set of aggregated features;

performing feature extraction, using a set of modular components of a modular classifier network, on the set of aggregated features to generate a set of extracted features;

generating, using a pinch detection head, a probability score indicating a likelihood of an occurrence of a pinch gesture based on the set of extracted features;

determining, using triggering logic, whether a pinch gesture has occurred based at least in part on the probability score; and providing a pinch detection output based at least in part on the determining.

\* \* \* \* \*